A. LEVIN.
BUTTONHOLE MEASURING AND CUTTING MACHINE.
APPLICATION FILED SEPT. 20, 1912.

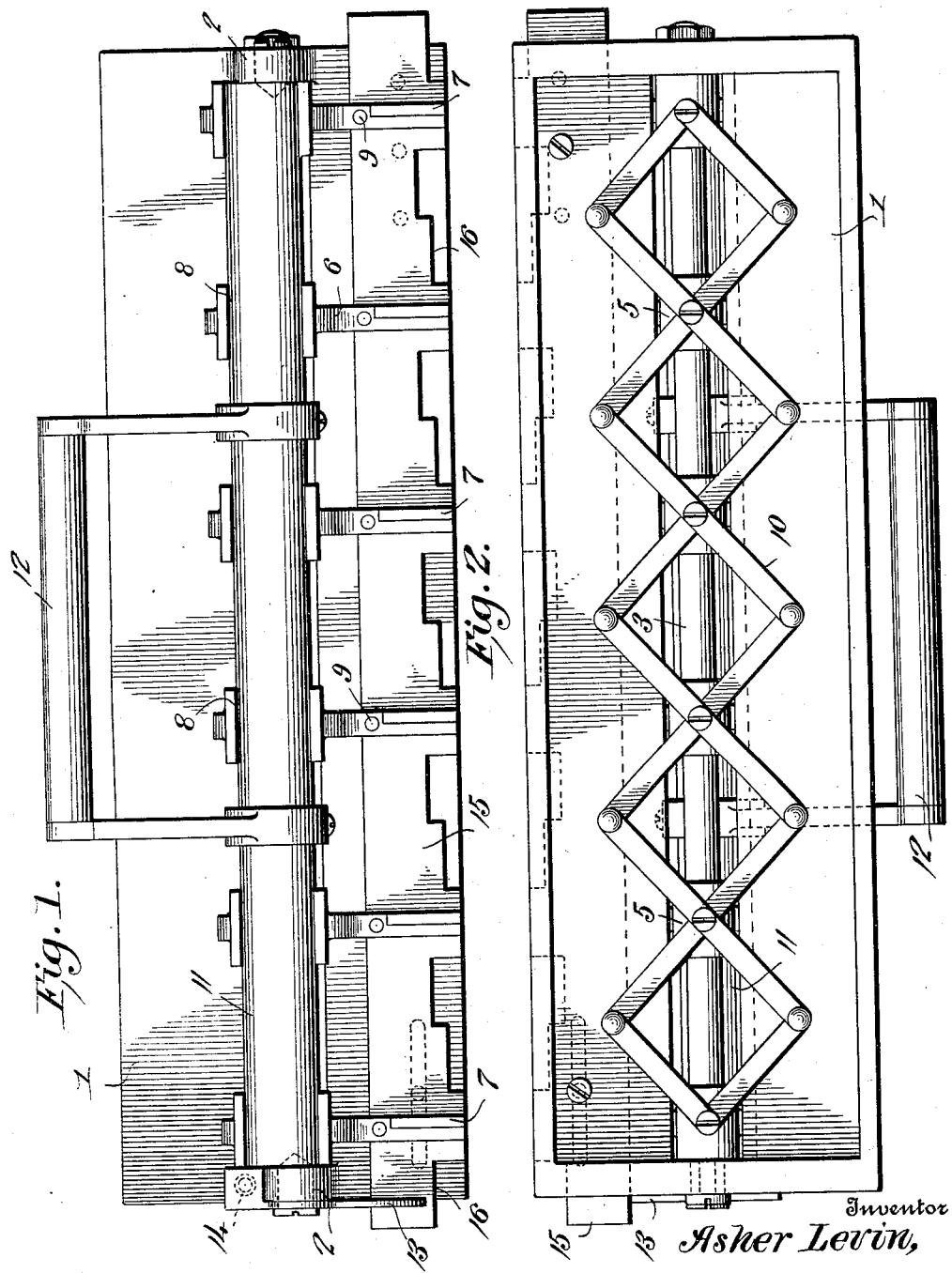

1,071,445.

Patented Aug. 26, 1913.

2 SHEETS—SHEET 2.

Inventor
Asher Levin,

Witnesses
Carroll Bailey.
V. B. Hilliard.

By Victor J. Evans
Attorney

UNITED STATES PATENT OFFICE.

ASHER LEVIN, OF BALTIMORE, MARYLAND.

BUTTONHOLE MEASURING AND CUTTING MACHINE.

1,071,445.  Specification of Letters Patent.  Patented Aug. 26, 1913.

Application filed September 20, 1912. Serial No. 721,475.

*To all whom it may concern:*

Be it known that I, ASHER LEVIN, a citizen of the United States, residing at Baltimore city, State of Maryland, have invented new and useful Improvements in Buttonhole Measuring and Cutting Machines, of which the following is a specification.

The invention has for its object the provision of a machine for cutting buttonholes in garments and embodying means for regularly spacing the cutters and for cutting buttonholes of varying lengths to meet varying conditions.

The invention is designed to supply a machine of the character hereinbefore stated which in its general organization is simple, effective in operation and easy of manipulation and adjustment.

The invention consists of the novel features, details of construction and combination of parts, which hereinafter will be more particularly set forth, illustrated in the accompanying drawings, and pointed out in the appended claims.

Figure 3:
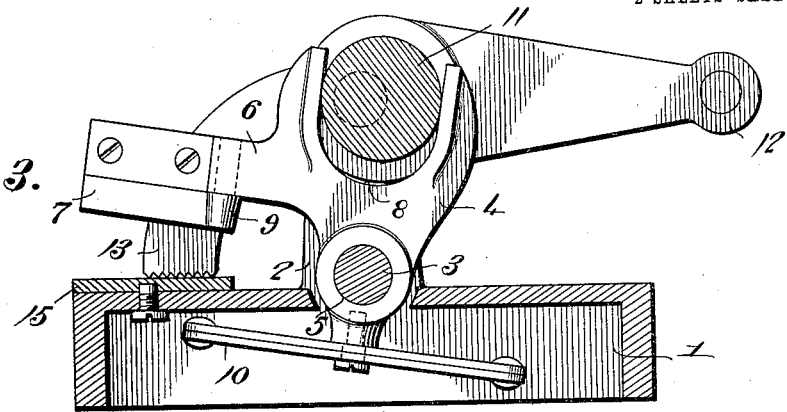
Figure 4:
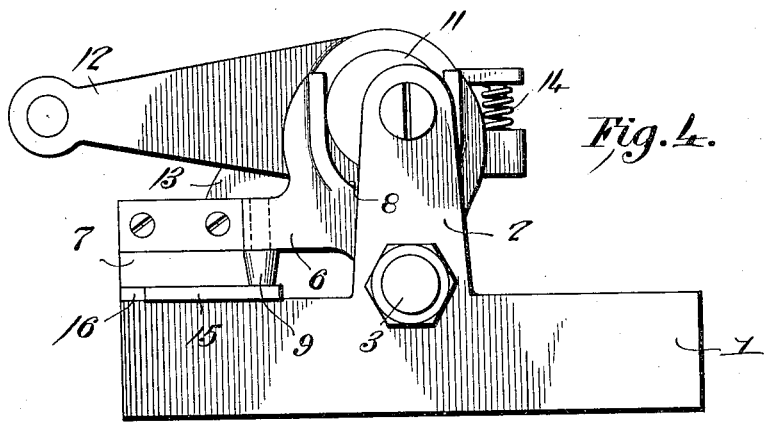
Figure 5:
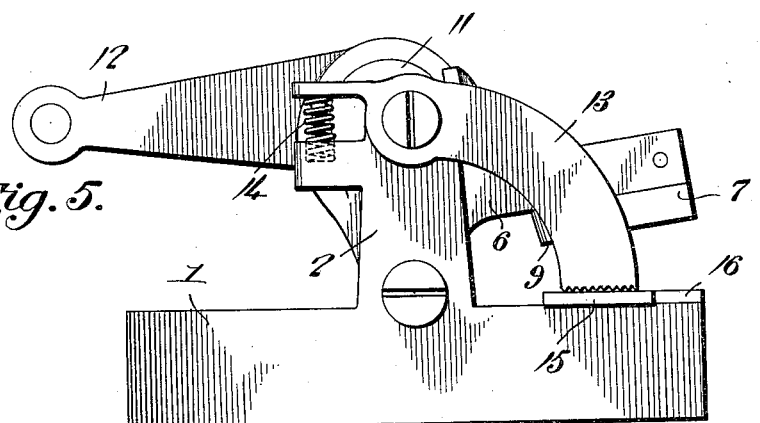

Referring to the drawings, forming a part of the specification, Figure 1 is a top plan view of a machine of the character stated embodying the invention. Fig. 2 is a view of the machine inverted and as seen from the bottom side. Fig. 3 is a transverse section. Fig. 4 is an end view. Fig. 5 is a detail view of the plate for supporting the work against the action of the cutters.

Corresponding and like parts are referred to in the following description, and indicated in all the views of the drawings, by the same reference characters.

The machine embodies a base 1 which is hollow and has standards 2 at opposite ends. A rod or bar 3 is supported at its ends in the standards 2 and receives the cutters which are mounted thereon so as to receive a two-fold movement, the one for spacing and the other for advancing to and moving away from the work. A plurality of cutters are provided each being the substantial duplicate of the other. Each of the cutters consists of a head 4 having a socket 5 and an extension 6 to which a blade 7 and a punch 9 are attached. The head 4 is notched in its upper end, as indicated at 8, to receive the cam shaft, the parts at opposite sides of the notch 8 being widened to obtain ample bearing against the sides of the cam shaft. The sockets 5 project a short distance upon opposite sides of the heads 4 in order to obtain an extended bearing upon the rod or bar 3. The heads 4 are mounted to slide and to oscillate upon the rod 3, the sliding movement providing for proper spacing of the cutters and the oscillatory movement enabling the cutters to be moved to and away from the work. A lazy tongs structure 10 connects the cutters so that adjustment of one of the cutters results in a corresponding movement of the remaining cutters so as to equally space them apart. The lazy tongs structure 10 has its elements pivotally connected to the series of cutters at their points of crossing. The lazy tongs structure is housed within the base.

The cam shaft 11 is mounted at its ends in the standards 2 and engages the notched portions 8 of the cutter heads 4 so that movement of the cam shaft in one direction advances the blades to the work and movement of the cam shaft in the opposite direction carries the blades away from the work. The cam shaft 11 is adapted to be operated by means of a handle 12 which embodies spaced arms and a cross piece connecting the outer ends of such arms.

A work holder 13 is located at one end of the base and comprises a curved lever which is pivoted between its ends to one of the standards 2, a spring 14 serving to press the upper end of the lever upward, whereby its lower end is forced downward so as to grip the work placed between it and the base.

A plate 15 is located along one edge of the base at a point below the blades of the cutters and supports the work. When the machine is adapted for cutting buttonholes of different sizes the plate 15 may have portions cut from one edge, as indicated at 16, so as to provide portions of different widths corresponding to the various lengths of buttonholes to be cut. By shifting the plate 15 upon the base 1 portions may be brought in position below the blades so as to cut buttonholes of the required length.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In combination a support, a plurality of cutters mounted upon the support, each of said cutters consisting of a head embodying a socket, a notched portion and an extension, the latter having the cutter proper attached thereto, means for simultaneously moving the cutters to effect proper spacing thereof, and a shaft having a cam portion engaging the notched portions of the cutters to effect simultaneous movement thereof.

2. In combination a rod, a plurality of cutters mounted upon the rod, each consisting of a head embodying a socket through which the rod passes, a notched portion and an extension to which the cutter proper is attached, a shaft paralleling the rod and having a cam portion entering the notches of the cutters, and means connected with the cutters for effecting a simultaneous and proper spacing thereof.

3. A machine of the character described comprising a base, a rod supported upon the base, a plurality of cutters slidably mounted upon the rod, each of said cutters consisting of a head having a socket, a notched portion and an extension, the latter receiving the cutter proper, lazy tongs connecting the cutters and arranged within the base below the said rod, means between the lazy tongs connection and base for operating the lazy tongs to properly space the cutters, and a shaft mounted upon the base and having a cam portion entering the notched portions of the cutters to effect simultaneous movement thereof.

4. A buttonhole cutter comprising a hollow base provided at opposite ends with standards, a rod supported at its ends in said standards, a plurality of cutters mounted upon the rod, each consisting of a head having a socket, a notched portion and an extension, the latter receiving the cutter proper, a lazy tongs arranged within the base and connecting the cutters, operating means between the lazy tongs and base for effecting a proper spacing of the cutters, and a shaft mounted in the standards and having a cam portion engaging the notched portions of the cutters.

In testimony whereof I affix my signature in presence of two witnesses.

ASHER LEVIN.

Witnesses:
CHARLES W. LIMPERT,
J. SPENCER CLARK.

---

Copies of this patent may be obtained for five cents each, by addressing the "Commissioner of Patents, Washington, D. C."